Sept. 8, 1964 W. HANSON, JR 3,147,852
CONVEYOR COVER
Filed Oct. 11, 1962 2 Sheets-Sheet 1
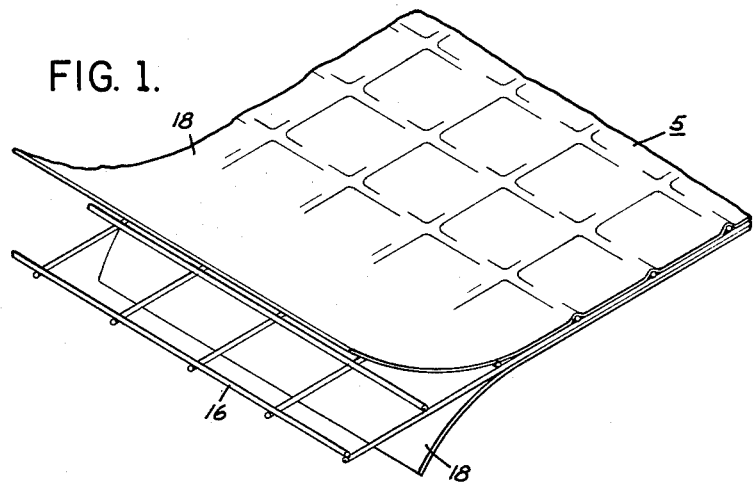
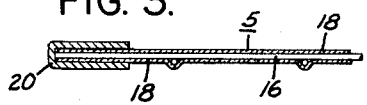
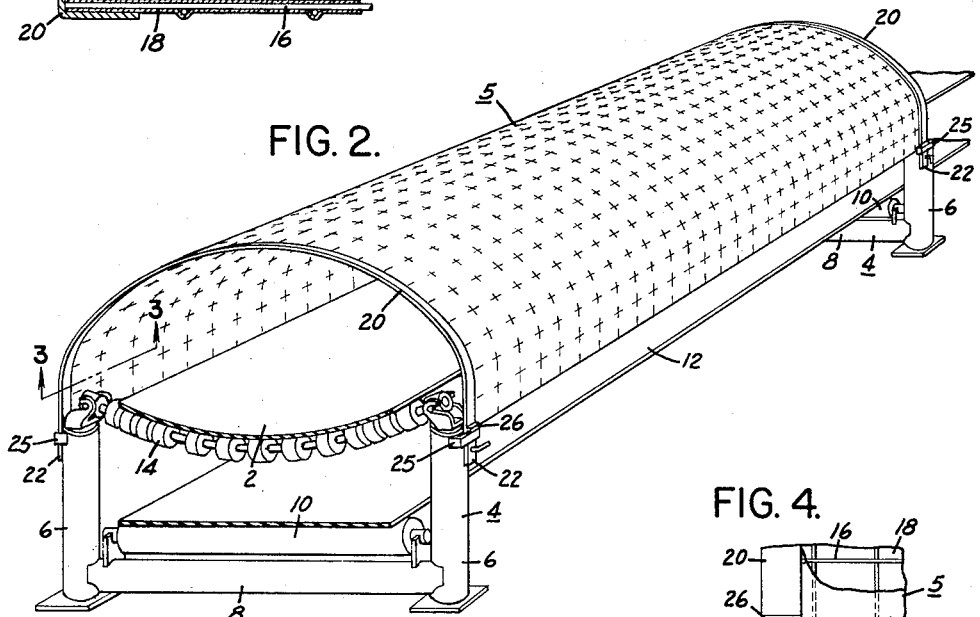
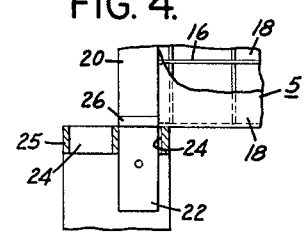
*INVENTOR.*
WILLIAM HANSON, JR.
BY
ATTORNEY

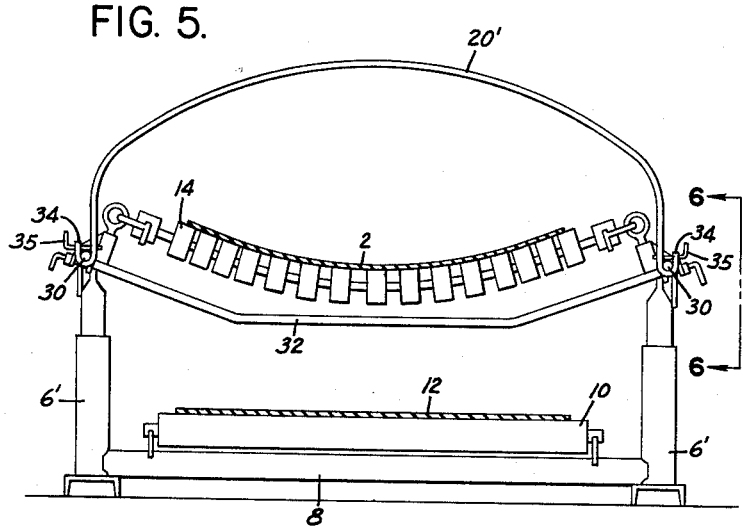
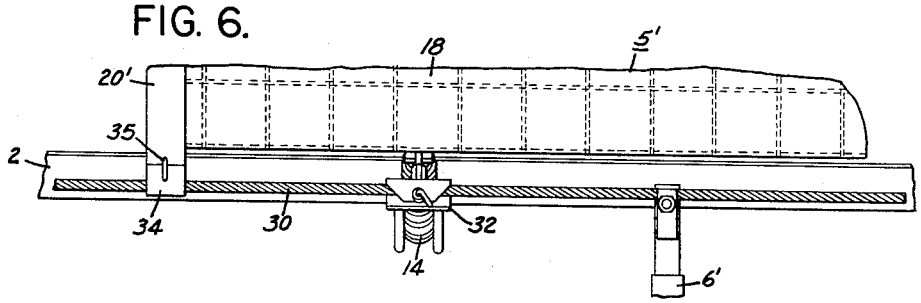
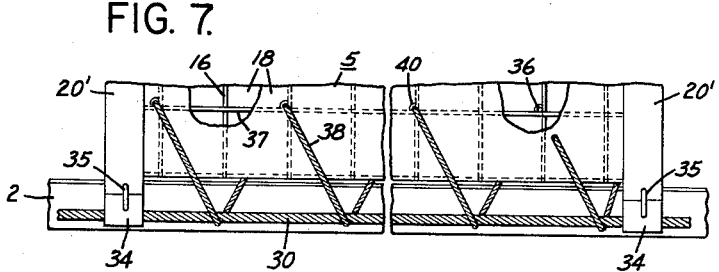

United States Patent Office 3,147,852
Patented Sept. 8, 1964

3,147,852
CONVEYOR COVER
William Hanson, Jr., Dover, Ohio, assignor to Joy Manufacturing Company, Pittsburgh, Pa., a corporation of Pennsylvania
Continuation of application Ser. No. 783,564, Dec. 29, 1958. This application Oct. 11, 1962, Ser. No. 232,921
5 Claims. (Cl. 198—204)

This invention relates to conveyor apparatus and more particularly to an elongated belt conveyor having a flexible and transparent cover extending above the material being transported.

This application is a continuation of my copending application Serial No. 783,564, filed December 29, 1958, for Conveyor Apparatus, now abandoned.

At the present time it is common practice to transport loose material from one location to another by means of a traveling endless conveyor belt. In many cases it is desirable to transport a material over the open ground which exposes the material on the belt to the prevailing winds at the conveyor location. With light or fine material the wind is sometimes sufficient to blow the conveyed material off the conveyor. In still other cases of outside material transporting it is desirable to protect the conveyed material from the elements such as rain and snow. In addition there are numerous belt conveyors employed inside buildings in which it is desirable to cover the conveyed material. As will readily be appreciated it is also highly desirable that the conveyor cover be transparent to permit observation of the conveyed material at any point along the conveying run.

Accordingly one object of this invention is to provide a new and improved conveyor having a flexible, transparent cover extending over the conveyed material.

A specific object of this invention is to provide a new and improved cover for a conveyor having a flexible, transparent cover formed by wire reenforced plastic sheet.

Another object of this invention is to provide a new and improved conveyor having a plurality of elongated flexible and transparent covers secured in longitudinal abutting relationship to provide a cover throughout the length of the conveyor.

A more specific object of this invention is to provide a new and improved conveyor having an elongated flexible and transparent cover secured to side rope supports with the elongated edges of the cover being laced to the side ropes, respectively.

Another specific object of this invention is to provide a new and improved conveyor having a flexible transparent cover secured to spaced rigid conveyor support stands by means of a slip fit joint.

These and other objects of this invention will become more apparent upon consideration of the following detailed description of a preferred embodiment thereof when taken in conjunction with the following drawings, in which:

FIG. 1 is a perspective view of a portion of a conveyor cover constructed in accordance with the principles of this invention.

FIG. 2 is a perspective view of a portion of a belt conveyor constructed in accordance with the principles of this invention.

FIG. 3 is an enlarged cross sectional view of a portion of the conveyor cover as shown in FIG. 2 taken along the lines 3—3 thereof.

FIG. 4 is an enlarged side elevational view of a portion of the end of the conveyor as shown in FIG. 2.

FIG. 5 is a cross sectional view of another belt conveyor constructed in accordance with the principles of this invention.

FIG. 6 is a side elevational view of the conveyor as shown in FIG. 5.

FIG. 7 is a side elevational view similar to FIG. 6 having an anchoring lacing for the cover.

Referring to FIG. 2 it will be noted that the conveyor illustrated therein comprises an elongated upper conveying run 2 of belting which is supported for longitudinal movement on laterally extending longitudinally spaced stands 4. Although the stands 4 may be of various well known structures as shown each stand 4 comprises a pair of upright pipe supports 6 located adjacent the sides of the belt 2, respectively, which are held in rigid spaced relationship by means of a cross brace 8 suitably fastened to and extending therebetween. The cross brace 8 supports a suitable roller 10 for suitably supporting an elongated return run 12 of the conveyor belt below the upper run 2 and a suitable idler roller 14 is supported between the upper ends of the supports 6 for suitably supporting the upper run 2 of the conveyor belt.

An elongated flexible transparent cover 5 is secured to both of the supports 6 of each longitudinally spaced stand 4 to provide an enclosure for the upper run 2 of the conveyor belt. Referring to FIG. 1 it will be noted that the cover 5 comprises a suitable wire mesh 16 having a suitable transparent and flexible sheet 18 suitably secured to the opposite sides thereof. Although the wire mesh 16 may be of any suitable commercially available type, for the purposes of this invention a light gauge soft wire having a six inch square opening has been found to be quite satisfactory. Similarly although various flexible and transparent materials may be employed for the sheets 18 a thin polyethylene plastic sheet has proved to be quite satisfactory. With such a polyethylene sheet the sheets 18 may readily be secured to the opposite sides of the wire mesh 16 in various well known manners. After the sheets 18 have been secured to the wire mesh 16 the wire mesh 16 is then suitably formed to obtain an approximate semi-elliptical cross sectional form. The cover 5 is then suitably secured to the support 6 so that it extends longitudinally between spaced stands 4 laterally between the supports 6 of each stand 4, and arcuately above the upper run 2 of the conveyor belt. Once the cover 5 has been so formed it may be secured to the supports 6 in various suitable manners. Thus, although not shown, it will be realized that the wire mesh 16 may be rigidly secured to the supports 6 by various suitable fastening means or fastening methods such as by being tied, brazed or bolted to the supports 6.

FIGS. 3 and 4 illustrate the preferred form of this invention in which each end of the cover 5 is provided with a supporting arch 20 formed from light gauge steel whereby it may readily be formed as hereinafter described. As shown, the arch 20 is U-shaped in cross section and has the same curvature as the cover 5 so that an arch 20 may be slipped over each end of the cover 5 to closely receive the ends of the cover 5 closely between the arms thereof. When so located the cover 5 is secured to the arches 20 in any suitable manner such as by pinching the arms of the arches 20 together to firmly grip the wire mesh 16 and sheets 18 of the cover 5 firmly therebetween. Each side of each arch 20 extends outwardly beyond the longitudinal side of the cover 5 to provide downwardly extending lug portions 22 which are suitably secured to the surfaces of the supports 6 remote from the upper run 2 of the conveyor belt. As shown, the supports 6 are preferably provided on such remote surfaces adjacent their upper ends with brackets 25, respectively, which extend laterally thereof. Each bracket 25 is suitably rigidly secured to the support 6 cooperable therewith and is provided with a pair of adjacent slots 24 each of which is of a size to closely receive a lug portion 22 of the arch 20 therein.

With the described structure a cover for a conveyor may quickly be provided in the field. The conveyor system is first installed in which a plurality of supports 6 are provided which are longitudinally spaced from each other as desired. The wire mesh 16 and sheets 18 of the cover 5 are then cut to the desired length and the arches 20 secured to the ends thereof so that the longitudinal spacing of the lug portions 22 on the sides of the cover 5 correspond to the longitudinal spacing of the longitudinally adjacent slots 24 on the side of the longitudinally spaced supports 6, respectively. The four quadrangularly spaced lug portions 22 are then slidably inserted into the four quadrangularly spaced slots 24 whereby the cover 5 is located to extend longitudinally along and arcuately above the upper run 2 of the conveyor belt. Any suitable means may be provided on the lug portions 22 to engage the brackets 25 to locate the cover 5 to the desired height above the runs 2 which as shown comprises integral stops 26 spaced inwardly from the free ends and extending outwardly of the lug portions 22 to engage the upper surfaces of the brackets 25, respectively. Since only the longitudinally adjacent slots 24 are employed for covering a section of the conveyor belt a number of longitudinally abutting covers 5 may be provided throughout the conveyor to completely cover the conveyor belt.

FIGS. 5 and 6 illustrate another conveyor system in which like parts have been identified by the same reference numerals and similar parts have been identified by the same reference numerals primed. As shown longitudinally spaced supports 6', similar to the supports 6 previously described, except that the supports 6' support longitudinally extending flexible side cables 30 which cables 30 in turn support cross supports 32 at longitudinally spaced locations therealong. The supports 32 support an idler roller 14 between the upper runs 2 of the conveyor belt as is well known in the art. The cover 5' is similar to the cover 5 previously described except that each end of each arch 20' is provided with an outwardly extending reversely bent U-shaped portion 34. With such a construction the cover 5' with arches 20' attached is installed by initially compressing the arms of the arches 20' inwardly between the cables 30 so that the U-shaped portions 34 may be slipped therebetween, releasing the arms of the arches 20' and then elevating the entire structure so that the cables 30 are closely received within the U-shaped portions 34. Thereafter the U-shaped portions 34 may be rigidly secured to the cables 32 in any suitable manner such as by providing indexed openings in the arms thereof through which an elongated pin 35 may be inserted. If desired, the pin 35 may be threaded to engage a threaded opening in the innermost arm of the U-shaped portions 34 to prevent the accidental removal thereof during service. Again a number of covers 5' may be secured to the cables 30 is longitudinal abutting relationship to completely cover the conveyor.

FIG. 7 illustrates another embodiment of this invention similar to that shown in FIGS. 5 and 6 and in which the sheets 18 have been provided with longitudinally spaced openings 36 adjacent the upper edge of the lowermost longitudinally extending wires 37 of the wire mesh 16 at each side of the cover 5'. With such a structure the sides of the cover 5' may be laced to the cable 30 by lacing a suitable wire 38 on each side of the cover 5' from an opening 36, around the lower surface of the adjacent cable 30 and upwardly through the next opening 36 so that the wire 38 extends around the upper surface of the wire 37. The ends of the wires 38 are suitably rigidly secured to the cable 30 or the supports 32. If desired, the openings 36 in the sheets 18 may be provided with a suitable eyelet 40 to prevent ripping of the sheets 18.

It will be noted that the described wire mesh and plastic sheet structures provide an exteremely light weight easily cut to length cover so that it may readily be installed or removed as desired. In addition the wire mesh and sheet may be stored in roll form so that little storage space is required for long conveyor covers. Nor is it essential that a particular length of conveyor cover be formed as any convenient length may be provided and if desired, a cover may be provided with a laterally arcuate form. Nor is it essential that the cover be secured to longitudinally adjacent supports for if desired a cover may be provided of a length whereby an intermediate support is not employed to secure the cover in position. Also by employing a wire mesh structure the entire cover is extremely flexible to permit it to be used on flexible side ropes. Having described preferred embodiments of this invention in accordance with the patent statutes, it is to be realized that modifications thereof may be made without departing from the broad spirit and scope of the invention. Accordingly, it is respectfully requested that this invention be interpreted as broadly as possible and be limited only by the prior art.

I claim:

1. In a conveyor having a pair of supported elongated laterally spaced flexible members with means secured thereto for supporting an elongated belt longitudinally movable therebetween, the improvement comprising: a plurality of longitudinally spaced, resilient, elongated, and formed support members extending upwardly with respect to said flexible members; flexible cover means secured to said support members and extending therebetween; said flexible cover means having a plurality of longitudinally spaced openings located inwardly of the longitudinal edges thereof respectively; means cooperating with said openings and said flexible members for securing said cover means to said flexible members; and means for securing said support members to such flexible members respectively.

2. In a conveyor having a pair of supported elongated laterally spaced flexible members with means secured thereto for supporting an elongated belt longitudinally movable therebetween, the improvement comprising: a plurality of longitudinally spaced, resilient, elongated, and formed support members; each of said support members having end portions depending from an intermediate portion thereof; flexible cover means secured to said support members and extending therebetween; said flexible cover means consisting of flexible reenforcing means having thin plastic transparent sheets secured to the opposite sides thereof; said flexible cover means having a plurality of longitudinally spaced openings located inwardly of the longitudinal edges thereof respectively; means cooperating with said openings and said flexible members for securing said cover means to said flexible members; said support members having means adjacent said end portions thereof for securing said support members to such flexible members respectively.

3. In a conveyor having a pair of supported elongated laterally spaced flexible members with means secured thereto for supporting an elongated belt longitudinally movable therebetween, the improvement comprising: a plurality of longitudinally spaced, resilient, arched support members; flexible cover means secured to said support members and extending therebetween; said flexible cover means consisting of flexible reenforcing means having thin plastic transparent sheets secured to the opposite sides thereof; said flexible cover means having a plurality of longitudinally spaced openings located inwardly of the longitudinal edges thereof respectively; means cooperating with said openings and said flexible members for securing said cover means to said flexible members; said arched support members having means adjacent the free ends thereof for securing said support members to such flexible members respectively.

4. In a conveyor having a pair of supported elongated laterally spaced flexible members with means secured thereto for supporting an elongated belt longitudinally movable therebetween, the improvement comprising; a plurality of resilient arch members, means for securing said arch members to said flexible members, respectively, with said arch members spaced longitudinally along said flexible members and extending upwardly therefrom, cover means secured to said arch members and extending therebetween, and said cover means being readily flexed without being internally stressed or permanently deformed upon flexure of said flexible members.

5. A conveyor device as defined in claim 4 in which said cover means is formed from a transparent material.

References Cited in the file of this patent

UNITED STATES PATENTS

| | | |
|---|---|---|
| 301,044 | Campbell | June 24, 1884 |
| 1,327,281 | Jenkins | Jan. 6, 1920 |
| 2,038,471 | Benatar | Apr. 21, 1936 |
| 2,883,035 | Erisman | Apr. 21, 1959 |